US012679347B2

(12) United States Patent
Shin et al.

(10) Patent No.: US 12,679,347 B2
(45) Date of Patent: Jul. 14, 2026

(54) PATH GENERATION SYSTEM FOR VEHICULAR COLLISION AVOIDANCE AND MITIGATION

(71) Applicants:HYUNDAI MOTOR COMPANY, Seoul (KR); KIA CORPORATION, Seoul (KR); KOREA ADVANCED INSTITUTE OF SCIENCE AND TECHNOLOGY, Daejeon (KR)

(72) Inventors: Jang-Ho Shin, Yongin-si (KR); Dong-Suk Kum, Daejeon (KR); Joon-Hee Lim, Daejeon (KR)

(73) Assignees: HYUNDAI MOTOR COMPANY, Seoul (KR); KIA CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 137 days.

(21) Appl. No.: 18/637,004

(22) Filed: Apr. 16, 2024

(65) Prior Publication Data

US 2025/0196847 A1 Jun. 19, 2025

(30) Foreign Application Priority Data

Dec. 14, 2023 (KR) ........................ 10-2023-0182334

(51) Int. Cl.
*B60W 30/09* (2012.01)
*B60W 30/095* (2012.01)
*G06N 3/092* (2023.01)

(52) U.S. Cl.
CPC ........ *B60W 30/09* (2013.01); *B60W 30/0956* (2013.01); *G06N 3/092* (2023.01); *B60W 2520/10* (2013.01); *B60W 2520/12* (2013.01); *B60W 2520/14* (2013.01); *B60W 2552/53* (2020.02); *B60W 2554/4041* (2020.02); *B60W 2554/4042* (2020.02)

(58) Field of Classification Search
CPC .............. B60W 30/09; B60W 30/095; B60W 30/0956; G06N 3/08
See application file for complete search history.

(56) References Cited

U.S. PATENT DOCUMENTS

| | | | | |
|---|---|---|---|---|
| 11,142,193 | B2 | 10/2021 | Kim | |
| 11,814,040 | B2 * | 11/2023 | Hardå | ................... B60W 30/09 |
| 2019/0101919 | A1 * | 4/2019 | Kobilarov | ....... B60W 30/18154 |
| 2020/0172093 | A1 * | 6/2020 | Kum | ................ B60W 30/0956 |

(Continued)

FOREIGN PATENT DOCUMENTS

KR 20210006551 A 1/2021

*Primary Examiner* — Anshul Sood

(74) *Attorney, Agent, or Firm* — Lempia Summerfield Katz LLC

(57) ABSTRACT

A path generation system for vehicular collision avoidance and mitigation generates a path with a lowest risk level of collision damage at the point in time at which an ego vehicle faces an imminent collision. The path generation system includes a neural network learning unit configured to output a terminal state of the ego vehicle based on information of the ego vehicle and information of surrounding vehicles. The path generation system may thus generate a path for minimizing damage to a driver and a passenger of the ego vehicle at the point in time at which the ego vehicle faces an imminent collision.

12 Claims, 11 Drawing Sheets

(56)          References Cited

U.S. PATENT DOCUMENTS

| | | | | |
|---|---|---|---|---|
| 2020/0307564 A1* | 10/2020 | Rahimi | .................... | G06N 3/08 |
| 2021/0009113 A1 | 1/2021 | Kim | | |
| 2021/0094612 A1* | 4/2021 | Chinni | ................... | B62D 6/002 |
| 2021/0300348 A1* | 9/2021 | Yasui | ..................... | G06N 3/092 |
| 2021/0300415 A1* | 9/2021 | Yasui | .................... | B60W 30/09 |
| 2023/0037367 A1* | 2/2023 | Qian | .............. | B60W 30/18163 |
| 2024/0010232 A1* | 1/2024 | Karkus | ............ | B60W 50/0097 |
| 2024/0101150 A1* | 3/2024 | Pronovost | ............ | G06N 3/0475 |

* cited by examiner

INFORMATION OF EGO VEHICLE AND
SURROUNDING VEHICLES

NEURAL NETWORK
LEARNING UNIT

Terminal state

PATH GENERATION UNIT

COLLISION AVOIDANCE AND
MITIGATION PATH

INITIAL
POSITION

L

R

TERMINAL POSITION
(OUTPUT OF NEURAL
NETWORK LEARNING UNIT)

y x

<Path Generation>

<Scenario 1>

<Scenario 2>

<Scenario 3>

<LANE INFORMATION NUMBERING METHOD>

<EVALUATION OF TTC-BASED RISK LEVEL>

<Path Generation>

<Collision Rate in Various Imminence Level>

<Impact in Various Imminence Level>

-------- steer

\<Steering (End-to-End RL)\>

-------- steer

<Steering (Ours)>

PATH GENERATION SYSTEM FOR VEHICULAR COLLISION AVOIDANCE AND MITIGATION

CROSS-REFERENCE TO RELATED APPLICATION

This application claims the benefit of and priority to Korean Patent Application No. 10-2023-0182334, filed on Dec. 14, 2023, which is incorporated herein by reference in its entirety.

TECHNICAL FIELD

The present disclosure relates to a system for generating a path for avoiding and mitigating a collision, at the point in time at which a vehicle faces an imminent collision.

BACKGROUND

Currently, a safety system is configured with an active and a passive safety system. The active safety system prevents a collision in advance by assisting in alarming against a collision risk or in vehicular braking and steering. The passive safety system reduces damage to a driver and a passenger through an air bag and a safety belt after a collision occurs.

The active safety system is a system that effectively operates 2 to 3 seconds before a collision occurs. The passive safety system is a system that operates effectively after the collision occurs. However, a time interval (the point in time at which a collision is imminent) occurs between operation of these safety systems.

Collision avoidance assistance systems, which are advanced driver assistance systems (ADAS) for vehicles in the related art, perform avoidance behaviors using pre-defined methods of taking an appropriate action under specific scenarios.

The collision avoidance assistance systems perform the following avoidance behaviors: prevention of a collision ahead; braking to avoid collisions with an opposite vehicle at an intersection and an intersecting vehicle; defense against an opposite vehicle during overtaking; defense against vehicles approaching from the front and from the lateral side; and steering control for assisting in rear and side collision prevention.

However, this system is dependent upon preset rules and decision algorithms, and thus has a limitation in that complex and various actual collision situations are difficult to deal with.

In addition, the current vehicular collision avoidance systems are developed using a rule-based technique. Likewise, this rule-based collision avoidance technique has limited performance under various and complex collision situations that occur in the real world.

In order to address this problem, research has been conducted on learning capable of dealing with various and complex collision situations and on optimization-based path planning.

However, much research on learning-based path planning utilizes vehicular control inputs as outputs of a neural network. A path generated through this technique is non-continuous and non-realistic, and thus a precise path is not derived. Thus, stability may not be ensured.

In addition, the optimization-based collision avoidance path planning requires a large amount of computation, and thus has the disadvantage of a path being difficult to provide in real time.

The matters described in this Background section are intended to help understanding of the background of the present disclosure. Thus, the Background section may include matters that do not form the related art that is already known to a person of ordinary skill in the art to which the present disclosure pertains.

SUMMARY

The present disclosure has been made in an effort to solve the above-mentioned problems associated with the related art. An object of the present disclosure is to provide a path generation system, for vehicular collision avoidance and mitigation, that is capable of generating a path for minimizing damage to a driver and a passenger within a vehicle at the point in time at which the vehicle faces an imminent collision.

According to one aspect of the present disclosure, a path generation system is provided. The path generation system includes a plurality of sensors configured to acquire state information of an ego vehicle and state information of a surrounding environment of the ego vehicle, including information of surrounding vehicles. The path generation system also includes a neural network learning unit configured to output a terminal state of the ego vehicle based on the information of the ego vehicle and the information of the surrounding vehicles. The path generation system additionally includes a path generation unit configured to generate a collision avoidance and mitigation path through the terminal state to mitigate a risk level of collision damage in a situation in which the ego vehicle faces an imminent collision.

In an embodiment, the neural network learning unit may be configured to learn i) speeds along X-axis and Y-axis, a yaw value, and lane information, of the ego vehicle and ii) relative positions along X-axis and Y-axis, a speed, a yaw value, and lane information of the surrounding vehicles.

In an embodiment, the terminal state may include a terminal position on the collision avoidance and mitigation path, a terminal speed on the collision avoidance and mitigation path, and a time taken to reach the terminal state.

In an embodiment, the neural network learning unit may be configured to perform learning using a deep reinforcement learning algorithm.

In an embodiment, the neural network learning unit may be configured to feed a collision impact index and time-to-collision (TTC)-based risk level, as a reward function, back to the deep reinforcement learning algorithm.

In an embodiment, the path generation unit may be configured to generate the collision avoidance and mitigation path using a quintic polynomial based algorithm for path planning.

In an embodiment, the quintic polynomial based algorithm for path planning may employ the following quintic polynomial equation, initial value, and boundary value, as follows:

$$x(t) = a_0 + a_1 t + a_2 t^2 + a_3 t^3 + a_4 t^4 + a_5 t^5$$

$$y(t) = b_0 + b_1 t + b_2 t^2 + b_3 t^3 + b_4 t^4 + b_5 t^5$$

$$t_{terminal} = T$$

$$x(0) = X_{ego}[\text{m}]$$

$$y(0) = Y_{ego}[\text{m}]$$

-continued $$v(0) = V_{ego}[\text{m/s}]$$

$$a(0) = A_{ego}[\text{m/s}^2]$$

$$\psi(0) = \psi_{ego}[\text{rad}]$$

$$x(t_{terminal}) = X_{ego} + R[\text{m}]$$

$$y(t_{terminal}) = Y_{ego} + L[\text{m}]$$

$$v(t_{terminal}) = v_T \times \tanh(R)[\text{m/s}]$$

$$a(t_{terminal}) = 0[\text{m/s}^2]$$

$$\psi(t_{terminal}) = 0[\text{rad}]$$

where x and y depict positions along x-y axes, v depicts a speed, a depicts an acceleration, $\Psi$ depicts a yaw value, t depicts a time, and a0, a1, a2, a3, a4, a5, b0, b1, b2, b3, b4, and b5 depict coefficients.

In an embodiment, the path generation unit may be configured to determine coefficients of the quintic polynomial equation using the initial value and the boundary value.

According to another aspect of the present disclosure, a path generation method is provided. The path generation method includes acquiring state information of an ego vehicle and state information of a surrounding environment of the ego vehicle detected by a plurality of sensors. The path generation method also includes outputting, by a neural network learning unit, a terminal state of the ego vehicle based on the information of the ego vehicle and the information of the surrounding vehicles. The path generation method additionally includes generating, by a path generation unit, a collision avoidance and mitigation path through the terminal state to mitigate a risk level of collision damage in a situation in which the ego vehicle faces an imminent collision.

With the path generation system and method for vehicular collision avoidance and mitigation according to embodiments of the present disclosure, the vehicle can be controlled using an optimal collision avoidance and mitigation path generated through learning. This control is performed at the point in time at which the ego vehicle faces an imminent collision, i.e., between operations of active safety and passive safety systems. Thus, damage to an occupant and the ego vehicle can be reduced or minimized.

Furthermore, a technique of generating the path is employed in place of a technique of utilizing vehicular control inputs as outputs of a neural network. Thus, stability can be ensured by the derivation of a more continuous, realistic, and precise path.

Additionally, it can be ensured that the path is provided in real time.

DETAILED DESCRIPTION

To fully understand the present disclosure, operational advantages thereof, and the objects that are accomplished by embodiments thereof, reference should be made to the accompanying drawings illustrating the embodiments and the specific features of the drawings.

A description of a well-known technology associated with the embodiments of the present disclosure, when it was determined that the description would unnecessarily obfuscate the nature and gist of the present disclosure, has been shortened or omitted.

When a component, device, element, or the like of the present disclosure is described as having a purpose or performing an operation, function, or the like, the component, device, or element should be considered herein as being "configured to" meet that purpose or to perform that operation or function.

The term "unit", "module", "controller", or the like, used in the present disclosure signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

Figure 1:
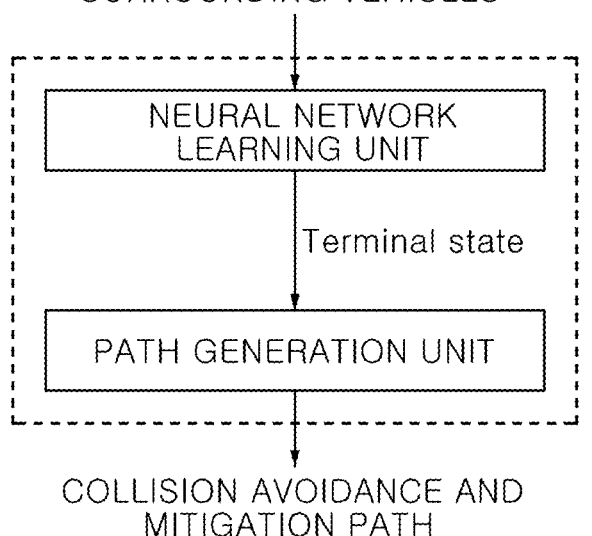
FIG. 1 is a diagram schematically illustrating a path generation system for vehicular collision avoidance and mitigation, according to an embodiment of the present disclosure.
Figure 2:
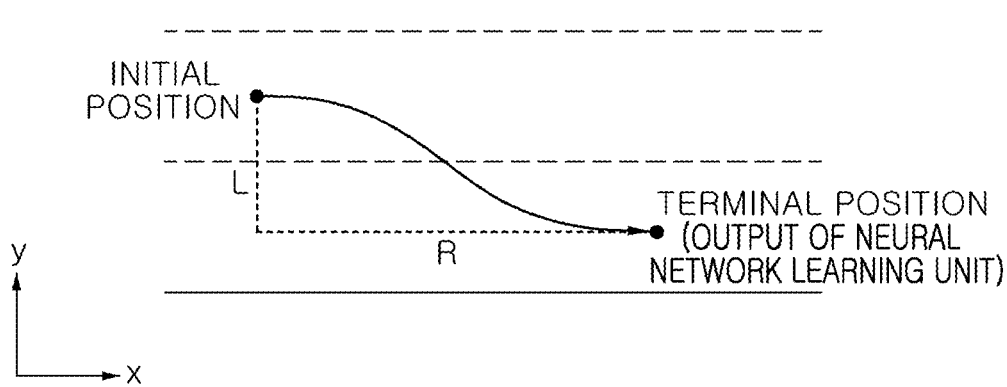
FIG. 2 is a diagram illustrating the concept of path generation, according to an embodiment of the present disclosure.

FIG. 1 is a diagram schematically illustrating a path generation system for vehicular collision avoidance and mitigation, according to an embodiment of the present disclosure. FIG. 2 is a diagram illustrating the concept of path generation, according to an embodiment of the present disclosure.

A path generation system for vehicular collision avoidance and mitigation according to an embodiment of the present disclosure is described below with reference to FIGS. 1 and 2.

The present disclosure is directed to a technology, as one of vehicular path planning technologies, that plans a path for minimizing damage to a driver and a passenger within a vehicle from the point in time at which the vehicle faces an imminent collision to just before the collision occurs.

The system according to an embodiment of the present disclosure includes a neural network learning unit and a path generation unit. The neural network learning unit outputs a terminal state for an appropriate collision avoidance and mitigation path by receiving input of information of an ego vehicle and information of surrounding vehicles (this is a high-level decision process for enabling the path generation unit to generate a safe path). The path generation unit generates a collision avoidance and mitigation path based on the terminal state output from the neural network learning unit. The terminal state may be a state that the ego vehicle should reach at the end of the collision avoidance and mitigation path, generated by the path generation unit, in order to avoid or mitigate collision.

In addition, a method of generating a path according to an embodiment of the present disclosure generates a path with a lowest risk level of collision damage at the point in time at which the ego vehicle faces an imminent collision. The method includes outputting, by a neural network learning unit, a terminal state of an ego vehicle by learning information of the ego vehicle and information of surrounding vehicles. The method also includes generating, by a path generation unit, a collision avoidance and mitigation path through the terminal state.

Accordingly, a path generation technology according to embodiments of the present disclosure enables handling of various and complex real-world collision situations and generates a realistic and continuous path.

The neural network learning unit may output a terminal state for an appropriate collision avoidance and mitigation path by receiving input of information of the ego vehicle and information of the surrounding vehicles. Techniques such as deep learning and deep reinforcement learning may apply to the neural network learning unit.

The path generation unit may generate a collision avoidance and mitigation path through a terminal state for a path output from the neural network learning unit. Techniques such as an A* algorithm, an RRT* algorithm, and a polynomial based path planning may apply to the path generation unit.

The path generated in this manner may be converted into a vehicular control input through a controller. With the vehicular control input, the collision avoidance and mitigation may be performed at the point in time at which the ego vehicle faces an imminent collision.

More specifically, the information of the ego vehicle and the information of the surrounding vehicles may be input into the neural network learning unit.

Examples of the information of the ego vehicle and examples of the information of the surrounding vehicles may include positions along the X-axis and Y-axis (with the condition that position information of the ego vehicle is not used), a speed, an acceleration, and a yaw.

The speed information and acceleration information of the ego vehicle may be acquired by a speed sensor (not shown) and an acceleration sensor (not shown).

The relative positions along the X-axis and Y-axis, a speed, an acceleration, and the like of the surrounding vehicles (a potential accident-causing vehicle) may be acquired by a front camera (not shown), a front radar (not shown), and front and rear lateral radars (not shown).

In addition, input information may include surrounding environment information, which may include surrounding object and road information. The surrounding environment information may be acquired through vehicle-to-everything (V2X) technology.

The V2X technology is a technology for exchanging information with objects, including other vehicles, mobile devices, and roads, over wired and wireless networks. Examples of the V2X technology include vehicle-to-vehicle (V2V) communication for recognizing traffic situations ahead and approaching vehicles, vehicle-to-infrastructure (V2I) communication for exchanging information with traffic infrastructure, including traffic lights, vehicle-to-pedestrian (V2P) communication for supporting pedestrian information, among others.

Accordingly, the neural network learning unit may receive, as input, information received through various sensors mounted on the vehicle and input of information received through GPS communication and V2X communication, and may perform learning, thereby outputting a terminal state of the ego vehicle for collision avoidance and mitigation.

The terminal state of the ego vehicle may include a position (e.g., a position R along the X-axis and a position L along the Y-axis) and a speed of the ego vehicle. The terminal state of the ego vehicle may also include a time taken for the ego vehicle to reach the terminal state.

In this manner, the terminal state for the appropriate collision avoidance and mitigation may be determined through the neural network learning unit, thereby enabling generation of a path that facilitates handling more various and complex situations.

The path generation unit may receive input of a terminal state for a path determined through the neural network learning unit, and may generate and output a collision avoidance and mitigation path from a current position of the ego vehicle to the terminal state for the path.

In embodiments, the path generation unit generates a path based on the terminal state for the appropriate collision avoidance and mitigation path determined in the neural network learning unit. Thus, various and complex collision situations can be handled more effectively and a more realistic and continuous path can be planned than collision avoidance and mitigation technology in the related art.

Figure 3:
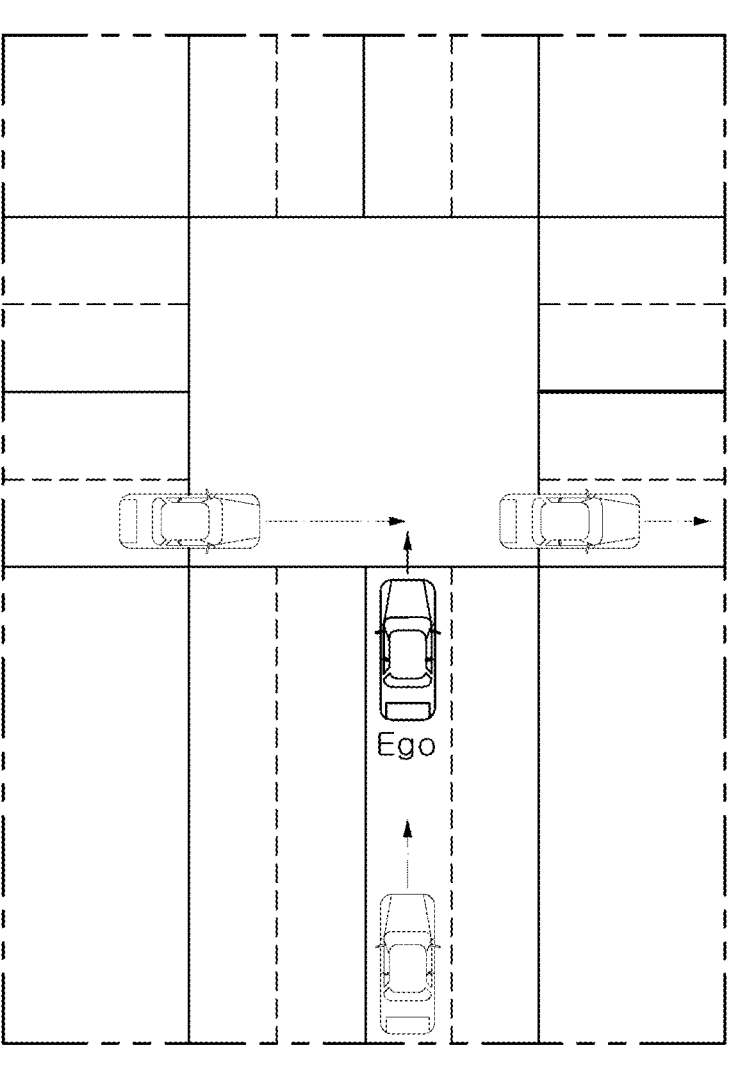
FIGS. 3-5 are diagrams each illustrating a collision scenario used for learning, according to embodiments of the present disclosure.
Figure 4:
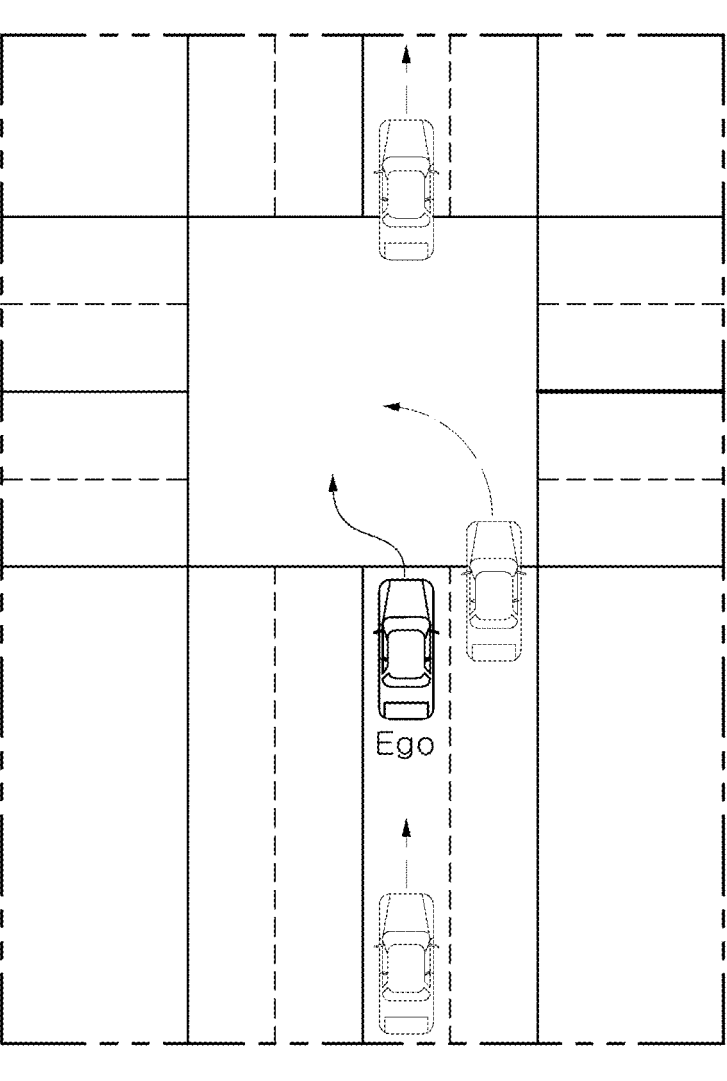
Figure 5:
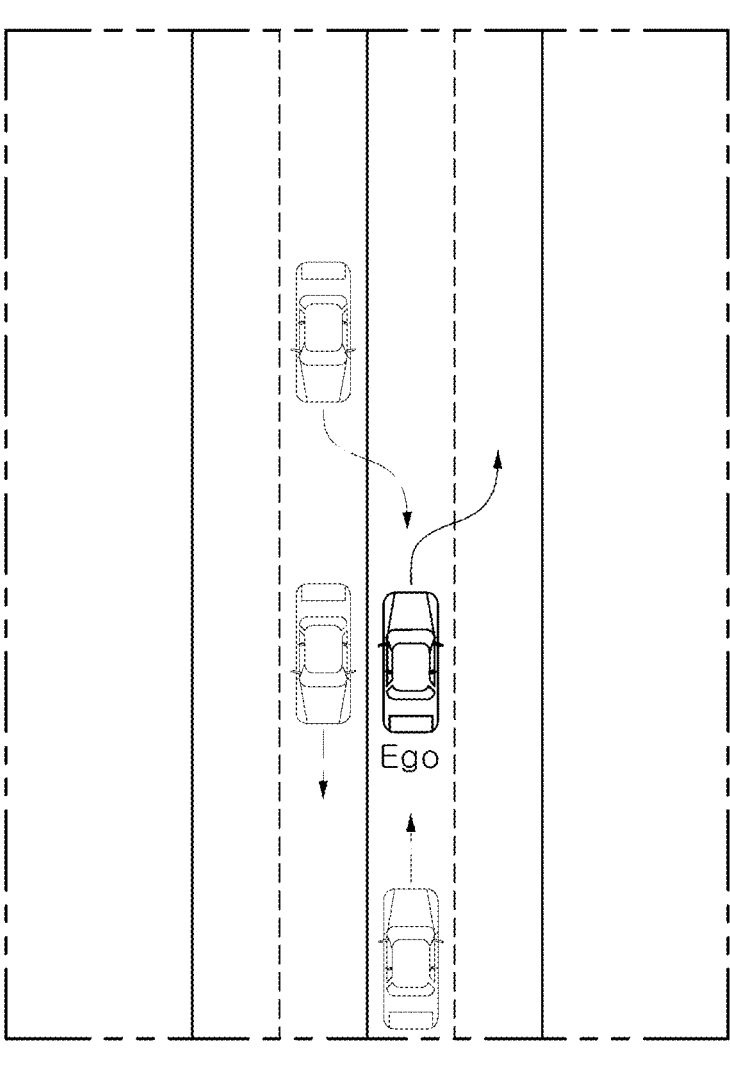

FIGS. 3-5 are diagrams each illustrating a collision scenario used for learning, according to embodiments.

The illustrated collision scenarios used for learning include an intersection collision situation in FIG. 3, a lane invasion situation illustrated in FIG. 4, and a reverse driving situation illustrated in FIG. 5, respectively. The ego vehicle illustrated is marked with the designation ego, and the surrounding vehicles are indicated by a relatively thin solid line.

Learning and verification were conducted according to a speed of an accident-causing vehicle and a distance thereto, considering various levels of difficulty ranging from a level of difficulty at which collision avoidance succeeds to a level of difficulty at which collision avoidance is impossible. The experiment was conducted on the assumption that in scenario situations, the ego vehicle recognized both a surrounding vehicle and a road situation.

In embodiments of the present embodiment, the neural network learning unit may use the soft actor-critic (SAC) deep reinforcement learning algorithm suitable for a continuous action, such as autonomous driving. Additionally, the path generation unit may use a path planning method that employs a quintic polynomial equation. This path planning method may be a path planning method capable of planning a realistic and continuous path. A cubic or quintic polynomial equation may be used as a polynomial equation.

A range of each output of the soft actor-critic may be set to plan a path for a short time from one second to two seconds in a manner that is suitable for generating a path in a collision-imminent situation. Examples of the detailed input and output of the soft actor-critic that was used in the experiment are as follows.

Input (State) into a soft actor-critic algorithm:
1) Speeds along the X-axis and the Y-axis, and a yaw, of the ego vehicle;

7

Figure 6:
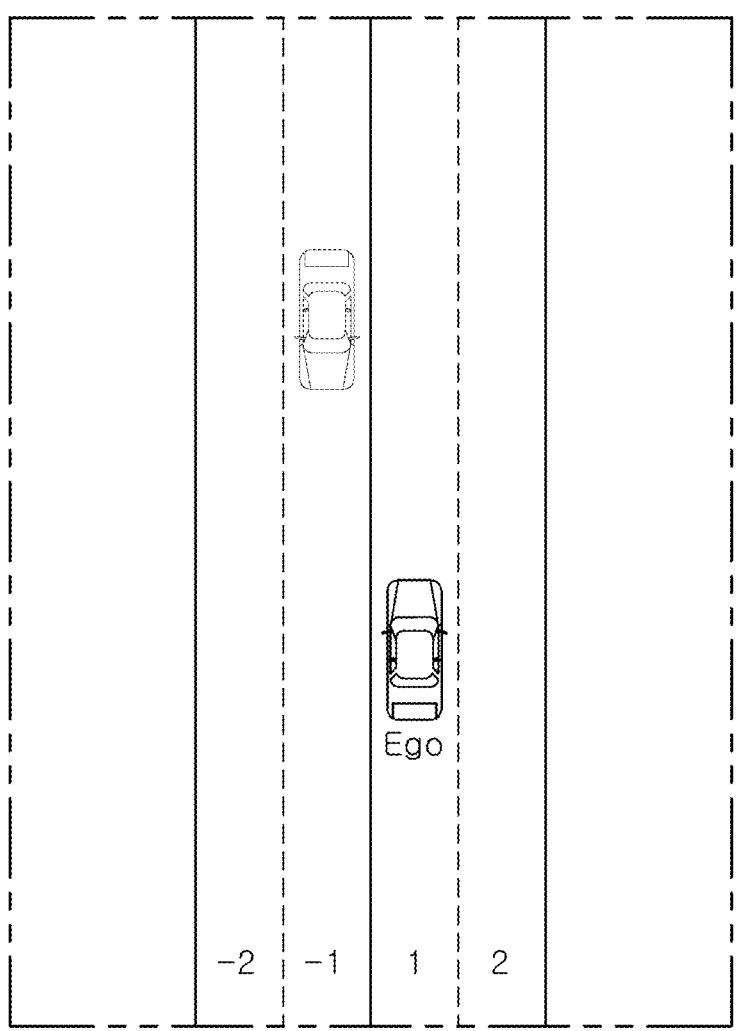
FIG. 6 is a diagram illustrating an example of a lane information numbering method, according to an embodiment of the present disclosure.

2) Relative positions along the X-axis and the Y-axis, a speed, and a yaw, of the surrounding vehicles; and 3) Lane information of the ego vehicle and lane information of the surrounding vehicles (as illustrated in FIG. 6, lanes in the forward direction and lanes in the reverse direction may be numbered as positive numbers and negative numbers, respectively, with each in order of increasing numbers).

Output (Action) from the soft actor-critic algorithm:

1) $v_1$: Speed in the terminal state for the quintic polynomial based path;

2) R: Longitudinal distance to the terminal state for the quintic polynomial equation-based path;

3) L: Computation and use of a lateral distance to each lane by selecting one of the following strategies: a lateral distance to the terminal state for the quintic polynomial based path; lane keeping; changing to a left lane; and changing to a right lane; and 4) T: Time taken to reach the terminal state for the quintic polynomial based path.

Actor and critic neural networks may each be configured with two fully connected layers, each containing 256 units, for example.

A reward function of the soft actor-critic may be configured through a collision impact index and a risk level based on time-to-collision (TTC).

A collision impact index may reflect the relative speeds, collision time, and masses of vehicles that result when the vehicles collide with each other. When the collision does not occur, the collision impact index is 0. Therefore, an algorithm may determine that the collision impact index of 0 indicates the best situation. Additionally, the algorithm may generate a path that can minimize collision impact when the collision occurs. Accordingly, the purposes of collision avoidance and damage reduction may be incorporated.

Figure 7:
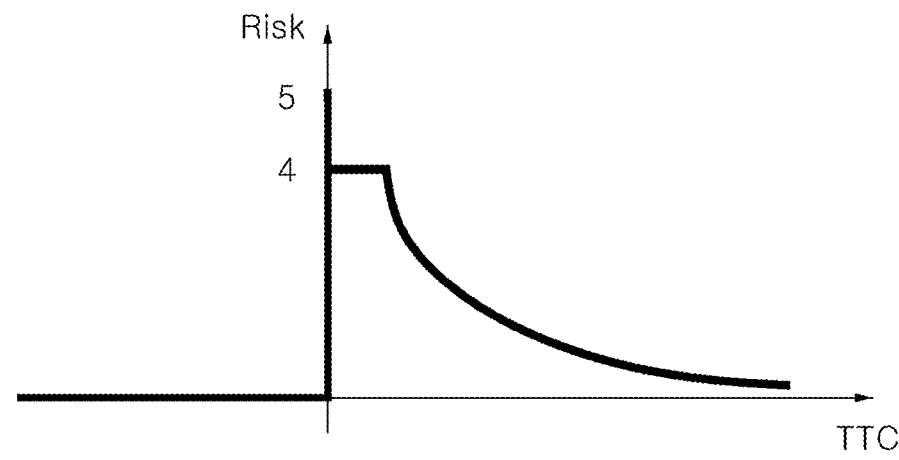
FIG. 7 is a diagram illustrating the concept of evaluation of a TTC-based risk level, according to an embodiment of the present disclosure.

However, in the case of the collision impact index, feedback on the output from the algorithm can be provided only when the collision occurs. According to embodiments, for supplementation, the TTC-based risk level may used as a reward function in such a manner that even though the collision does not occur, a safer path is planned. Thus, more feedback may be provided to a reinforcement learning agent. FIG. 7 is a graph illustrating the concept of evaluation of the TTC-based risk level, according to an embodiment. The TTC may be computed through, for example, a constant turn rate & velocity model.

A total reward value ($R_{total}$), including a reward value ($R_{collision}$) of a collision impact and a reward value ($R_{risk}$) of the TTC-based risk level, may be computed as follows.

$$R_{total} = w_{collision} R_{collision} + w_{risk} R_{risk} \quad \text{Mathematical Equation 1}$$

$$R_{collision} = -\text{impact (if collision)}$$

$$R_{risk} = -\text{Risk,}$$

where w is a weight.

$$\text{impact} = |F \cdot t| \quad \text{Mathematical Equation 2}$$

$$\text{Risk} = TTC^{-1} \quad \text{Mathematical Equation 3}$$

$$\text{Risk} = \text{clip (Risk, 0, 4)}(TTC > 0 \text{ seconds})$$

8

-continued
$$\text{Risk} = 5(TTC = 0 \text{ seconds})$$

where clip ( ) is a clip function.

Figure 8:
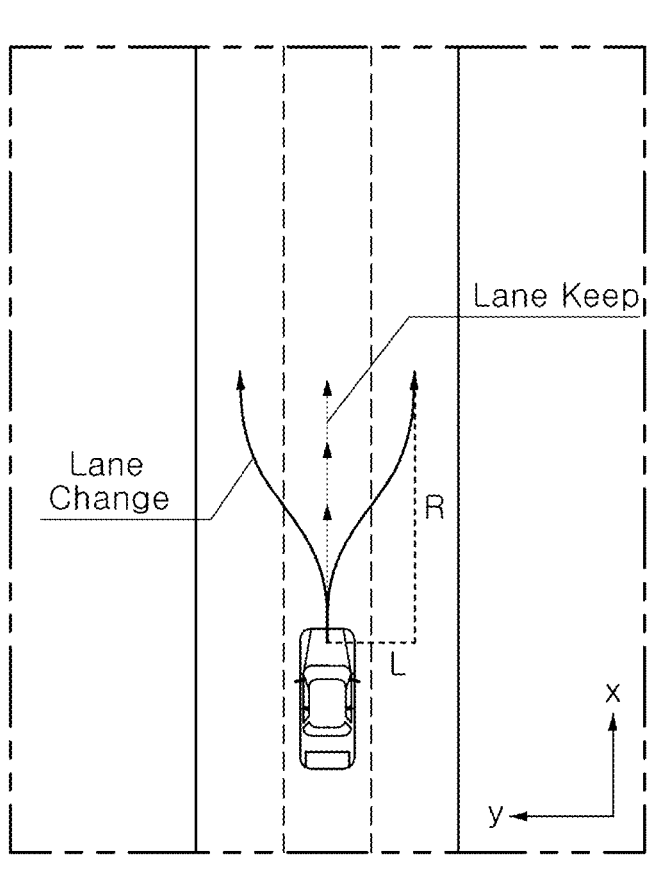
FIG. 8 is a diagram that is referenced to describe a path generation process, according to an embodiment of the present disclosure.

As illustrated in FIG. 8, for path generation according to embodiments of the present embodiment, a method of planning the quintic polynomial based path may be used as a polynomial-based planner.

The quintic polynomial based path may be generated as follows, based on 1) the speed in the terminal state for the quintic polynomial based path, 2) the longitudinal distance, 3) the lateral distance, and 4) the time that is determined through the soft actor-critic.

$$x(t) = a_0 + a_1 t + a_2 t^2 + a_3 t^3 + a_4 t^4 + a_5 t^5 \quad \text{Mathematical Equation 4}$$
$$y(t) = b_0 + b_1 t + b_2 t^2 + b_3 t^3 + b_4 t^4 + b_5 t^5$$

An initial condition and a boundary value may be expressed as in Mathematical Equation 5.

$$\text{Mathematical Equation 5}$$
$$t_{terminal} = T$$
$$x(0) = X_{ego}[m]$$
$$y(0) = Y_{ego}[m]$$
$$v(0) = V_{ego}[m/s]$$
$$a(0) = A_{ego}[m/s^2]$$
$$\psi(0) = \psi_{ego}[rad]$$
$$x(t_{terminal}) = X_{ego} + R[m]$$
$$y(t_{terminal}) = Y_{ego} + L[m]$$
$$v(t_{terminal}) = v_T \times \tanh(R)[m/s]$$
$$a(t_{terminal}) = 0[m/s^2]$$
$$\psi(t_{terminal}) = 0[rad]$$

where x and y depict positions along x-y axes, v depicts a speed, a depicts an acceleration, $\Psi$ depicts a yaw value, t depicts a time, and a0, a1, a2, a3, a4, a5, b0, b1, b2, b3, b4, and b5 depict coefficients.

Polynomial-equation coefficients $a_0$, $a_1$, $a_2$, $b_0$, $b_1$, and $b_2$ in Mathematical Equation 4 may be determined using the initial value as follows:

(1) Coefficients $a_0$ and $b_0$ of a quintic polynomial based path along the X-Y axes may be determined through the initial condition for a position at a point in time (0 seconds) at which a path is planned.

$$x(o) = a_0 = X_{ego}(\text{Position along the } X-\text{axis of the ego vehicle})$$
$$y(o) = b_0 = Y_{ego}(\text{Position along the } Y-\text{axis of the ego vehicle})$$

(2) Coefficients $a_1$ and $b_1$ of the quintic polynomial based path along the X-Y axes may be determined through the initial condition for a speed at the point in time (0 seconds) at which the path is planned.

9

$\dot{x}(0) = a_1 = V_{x,ego}$ (Speed along the X-axis of the ego vehicle)

$\dot{y}(0) = b_1 = V_{y,ego}$ (Speed along the Y-axis of the ego vehicle)

(3) Coefficients $a_2$ and $b_2$ of the quintic polynomial based path along the X-Y axes may be determined through the initial condition for an acceleration at the point in time (0 seconds) at which the path is planned.

$\ddot{x}(0) = 2a_2 = A_{x,ego}$ (Acceleration along the X-axis of the ego vehicle)

$\ddot{y}(0) = 2b_2 = A_{y,ego}$ (Acceleration along the Y-axis of the ego vehicle)

Polynomial-equation coefficients $a_3$, $a_4$, $a_5$, $b_3$, $b_4$, and $b_5$ in Mathematical Equation 4 may then be determined using the boundary value as follows:

(1) The following equation for the quintic polynomial based path along the X-Y axes may be generated through the condition for a position in the terminal state.

$x(t_{terminal}) = a_0 + a_1 t_{terminal} +$
$\qquad a_2 t_{terminal}^2 + a_3 t_{terminal}^3 + a_4 t_{terminal}^4 + a_5 t_{terminal}^5 = X_{ego} + R$ $y(t_{terminal}) =$
$b_0 + b_1 t_{terminal} + b_2 t_{terminal}^2 + b_3 t_{terminal}^3 + b_4 t_{terminal}^4 + bt_{terminal}^5 = Y_{ego} + L$ (2) The following equation for the quintic polynomial based path along the X-Y axes may be generated through the condition for a speed in the terminal state.

$\dot{x}(t_{terminal}) =$
$\quad a_1 + 2a_2 t_{terminal} + 3a_3 t_{terminal}^2 + 4a_4 t_{terminal}^3 + 5a_5 t_{terminal}^4 = v_T \times \tanh(R)$ $\dot{y}(t_{terminal}) = b_1 + 2b_2 t_{terminal} + 3b_3 t_{terminal}^2 + 4b_4 t_{terminal}^3 + 5b_5 t_{terminal}^4 = 0$ (3) The following equation for the quintic polynomial based path along the X-Y axes may be generated through the condition for an acceleration in the terminal state.

$\ddot{x}(t_{terminal}) = 2a_2 + 6a_3 t_{terminal} + 12a_4 t_{terminal}^2 + 20a_5 t_{terminal}^3 = 0$ $\ddot{y}(t_{terminal}) = 2b_2 + 6b_3 t_{terminal} + 12b_4 t_{terminal}^2 + 20b_5 t_{terminal}^3 = 0$ (4) Three polynomial-equation coefficients $a_3$, $a_4$, and as may be determined through the above-mentioned three equations for the quintic polynomial based path along the X-axis.

$x(t_{terminal}) = a_0 + a_1 t_{terminal} +$
$\qquad a_2 t_{terminal}^2 + a_3 t_{terminal}^3 + a_4 t_{terminal}^4 + a_5 t_{terminal}^5 = X_{ego} + R$ $\dot{x}(t_{terminal}) =$
$\quad a_1 + 2a_2 t_{terminal} + 3a_3 t_{terminal}^2 + 4a_4 t_{terminal}^3 + 5a_5 t_{terminal}^4 = v_T \times \tanh(R)$

10

-continued
$\ddot{x}(t_{terminal}) = 2a_2 + 6a_3 t_{terminal} + 12a_4 t_{terminal}^2 + 20a_5 t_{terminal}^3 = 0$ (5) Three polynomial-equation coefficients $b_3$, $b_4$, and $b_5$ may be determined through the above-mentioned three equations for the quintic polynomial based path along the Y-axis.

Figure 9:
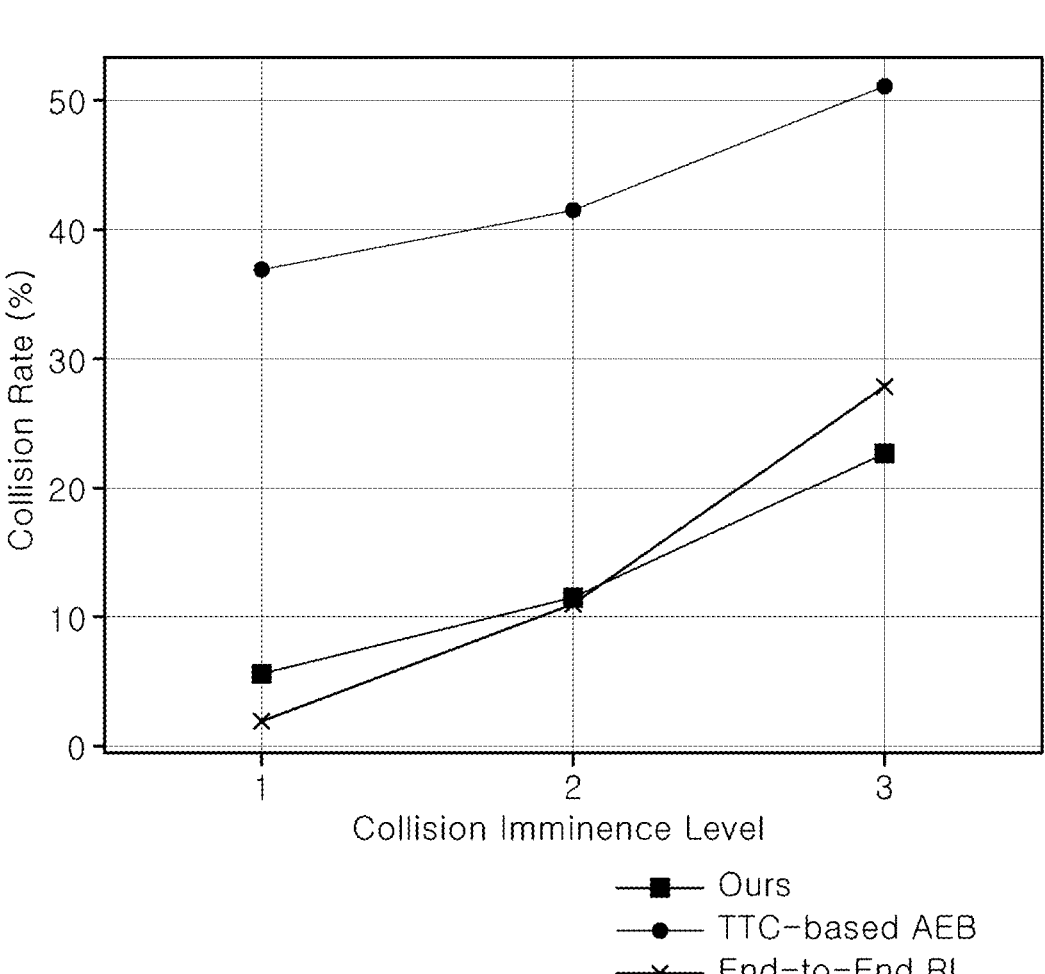
FIG. 9 is a graph illustrating the results of performance evaluation of a system according to an embodiment of present disclosure and a comparative example in terms of collision avoidance ratios.
Figure 10:
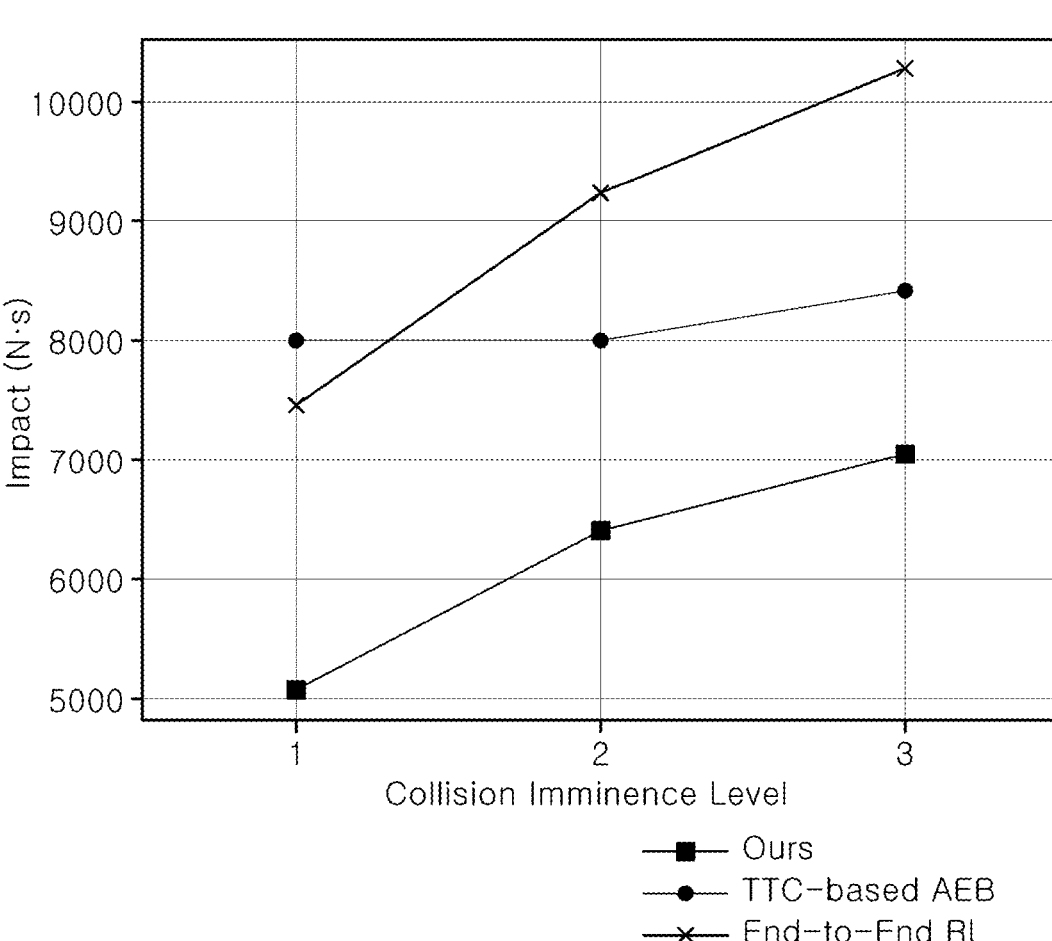
FIG. 10 is a graph illustrating the results of performance evaluation of a system according to an embodiment of present disclosure and a comparative example in terms of collision impact.

$y(t_{terminal}) =$
$b_0 + b_1 t_{terminal} + b_2 t_{terminal}^2 + b_3 t_{terminal}^3 + b_4 t_{terminal}^4 + bt_{terminal}^5 = Y_{ego} + L$ $\dot{y}(t_{terminal}) = b_1 + 2b_2 t_{terminal} + 3b_3 t_{terminal}^2 + 4b_4 t_{terminal}^3 + 5b_5 t_{terminal}^4 = 0$ $\ddot{y}(t_{terminal}) = 2b_2 + 6b_3 t_{terminal} + 12b_4 t_{terminal}^2 + 20b_5 t_{terminal}^3 = 0$ FIGS. 9 and 10 are graphs illustrating the results of performance evaluation of embodiments of the present invention and a comparative example. FIG. 9 illustrates the results of performance evaluation in terms of collision avoidance ratios. FIG. 10 illustrates the results of performance evaluation in terms of collision impact.

In order to evaluate the performance of a system and method according to embodiments of the present disclosure, testing was conducted 1,000 times on a system according to an embodiment of the present disclosure, a TTC-based autonomous emergency braking (AEB) system, and an end-to-end RL algorithm in terms of a collision rate and average collision impact in situations where collision is imminent at various collision imminence levels.

The results showed that, in collision imminent scenarios at various collision imminence levels, the algorithm according to embodiments of the present disclosure achieved a higher collision avoidance ratio and a more significantly reduced collision impact than the AEB, which performed longitudinal speed control based on the TTC (in most of the collision imminence scenarios, collision was avoided with high probability even at the point in time at which the ego vehicle faced an imminent collision).

In addition, the results showed that the algorithm according to embodiments of the present disclosure achieved a similar collision avoidance ratio to, and a lower collision index, than the end-to-end RL algorithm that used throttle, steering, and brake as outputs of reinforcement learning. Thus, it was verified that the technology according to embodiments of the present disclosure integrally enabled the function of avoiding the collision by performing avoidance behavior when the collision avoidance was possible and the function of reducing collision damage when the collision avoidance was impossible.

The collision imminence level here refers to the degree of collision imminence that is an arbitrary classification of the collision imminent scenarios in FIGS. 3-5 according to the distance/speed between the neighboring vehicle and the ego vehicle.

Accordingly, the higher the collision imminence level, the shorter distance between both the accident-causing and surrounding vehicles and the ego vehicle, with the accident-causing and surrounding vehicles approaching the ego vehicle more closely. From FIGS. 9 and 10, it can be seen that, as the collision imminence level becomes higher, a collision rate and a magnitude of collision impact increase.

The scenarios at various collision imminence levels were tested 1,000 times on a per-algorithm basis for a collision ratio and average collision impact, and the results of the testing were compared. From the following performance comparison (overall algorithm performance comparison) table, it can be seen that, in all tested scenarios, the algorithm according to embodiments of the present disclosure achieves higher performance in terms of the collision avoidance and the average collision impact than the TTC-based AEB and the end-to-end RL algorithm.

TABLE 1

| Algorithm | Collision Ratio (%) | Average Impact (Ns) |
|---|---|---|
| TTC-based AEB | 42.8 | 8296 |
| End-to-End RL | 12.8 | 9716 |
| Ours | 12.8 | 7004 |

In addition, steering values of the vehicle that were output through the end-to-end RL and the algorithm according to embodiments of the present disclosure in the same collision imminent scenarios were compared.

The end-to-end RL algorithm directly outputs control inputs, such as throttle, steering, and brake, as outputs of the reinforcement learning. Because of this, a precise path is not planned, and which point a path is destined to cannot be precisely recognized.

Figure 11:
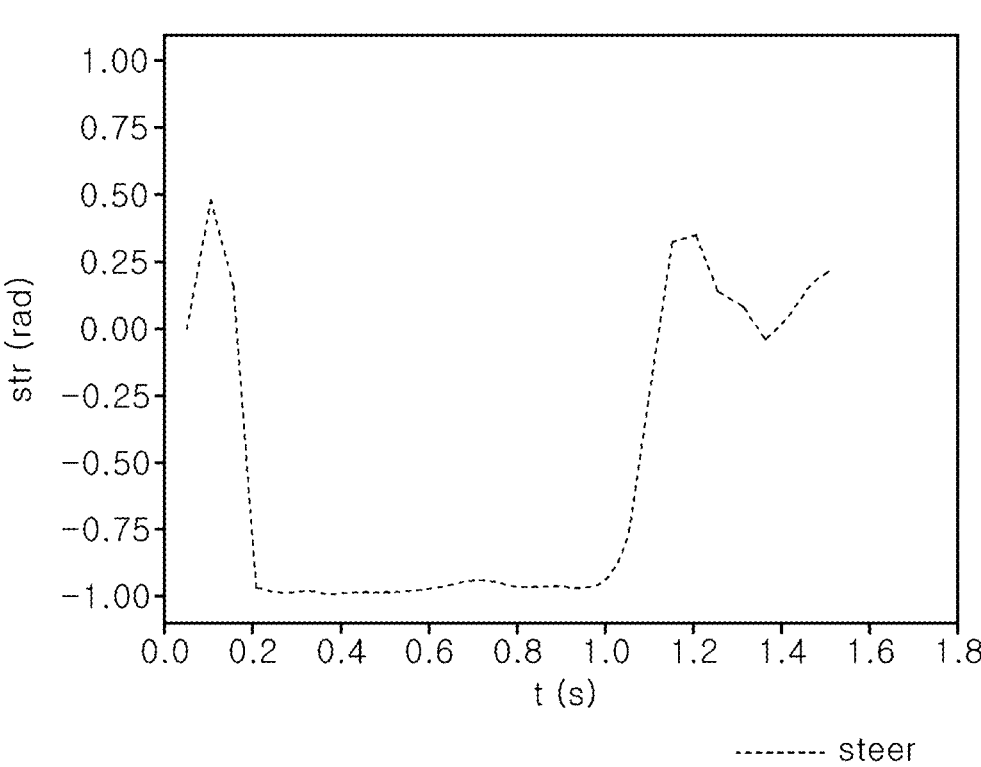
FIG. 11 is a graph illustrating steering values that resulted from evaluating a comparative example.

From a steering graph in FIG. 11, which is output through the end-to-end RL, it can be seen that which point a path is destined to cannot be precisely recognized and that a sharp steering maneuver is executed.

Figure 12:
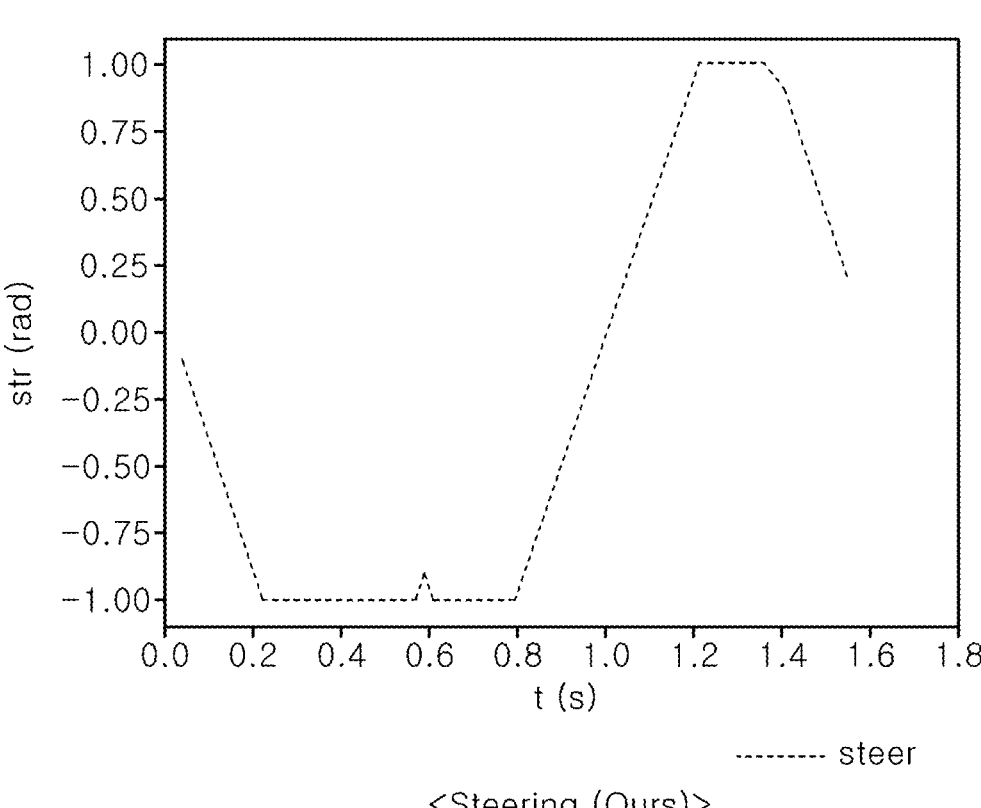
FIG. 12 is a graph illustrating steering values that resulted from evaluating a system according to embodiments of the present disclosure.

However, the technology according to embodiments of the present disclosure outputs the terminal state of a polynomial-based path, as an output of a neural network, and generates a path using a polynomial based path planning method. As a result, a precise path to a destination point is present. In addition, from a steering graph in FIG. 12, which is output by the algorithm according to embodiments of the present disclosure, it can be seen that a realistic and safe steering maneuver is executed.

As described above, according to embodiments of the present disclosure, a collision avoidance and mitigation path is generated in various and complex collision situations. Thus, an improvement in the stability of a partially or fully autonomous driving system is achieved.

The embodiments of the present disclosure are described above with reference to the accompanying drawings. However, the present disclosure is not limited to the described embodiments. It should be apparent to a person of ordinary skill in the art that various modifications and alterations of the embodiments may be made without departing from the scope of the present disclosure. The resulting modification or alteration examples fall within the scope of the appended claims. The scope of the present disclosure should be defined by the appended claims.

What is claimed is:

1. A path generation system, comprising:
a plurality of sensors configured to acquire state information of an ego vehicle and state information of a surrounding environment of the ego vehicle, including information of surrounding vehicles; and
a processor operatively connected to the plurality of sensors,
wherein the processor comprises:
a neural network learning unit configured to output a terminal state of the ego vehicle based on the state information of the ego vehicle and the information of the surrounding vehicles; and a path generation unit configured to generate a collision avoidance and mitigation path based on the terminal state to mitigate a risk level of collision damage in a situation in which the ego vehicle faces an imminent collision,
wherein the neural network learning unit is configured to perform learning using a deep reinforcement learning algorithm, and
wherein the neural network learning unit is configured to feed a collision impact index and time-to-collision (TTC)-based risk level, as a reward function, back to the deep reinforcement learning algorithm.

2. The path generation system of claim 1, wherein the neural network learning unit is configured to learn i) speeds along X-axis and Y-axis, a yaw value, and lane information of the ego vehicle and ii) relative positions along X-axis and Y-axis, a speed, a yaw value, and lane information of the surrounding vehicles.

3. The path generation system of claim 2, wherein the terminal state includes a terminal position on the collision avoidance and mitigation path, a terminal speed on the collision avoidance and mitigation path, and a time taken to reach the terminal state.

4. The path generation system of claim 3, wherein the path generation unit is configured to generate the collision avoidance and mitigation path using a quintic polynomial based algorithm for path planning.

5. The path generation system of claim 4, wherein the quintic polynomial based algorithm for path planning employs a quintic polynomial equation, initial value, and boundary value, as follows:

$$x(t) = a_0 + a_1 t + a_2 t^2 + a_3 t^3 + a_4 t^4 + a_5 t^5$$
$$y(t) = b_0 + b_1 t + b_2 t^2 + b_3 t^3 + b_4 t^4 + b_5 t^5$$
$$t_{terminal} = T$$
$$x(0) = X_{ego}[\text{m}]$$
$$y(0) = Y_{ego}[\text{m}]$$
$$v(0) = V_{ego}[\text{m/s}]$$
$$a(0) = A_{ego}[\text{m/s}^2]$$
$$\psi(0) = \psi_{ego}[\text{rad}]$$
$$x(t_{terminal}) = X_{ego} + R[\text{m}]$$
$$y(t_{terminal}) = Y_{ego} + L[\text{m}]$$
$$v(t_{terminal}) = v_T \times \tanh(R)[\text{m/s}]$$
$$a(t_{terminal}) = 0[\text{m/s}^2]$$
$$\psi(t_{terminal}) = 0[\text{rad}]$$

where x and y depict positions along x-y axes, v depicts a speed, a depicts an acceleration, $\Psi$ depicts a yaw value, t depicts a time, and $a_0$, $a_1$, $a_2$, $a_3$, $a_4$, $a_5$, $b_0$, $b_1$, $b_2$, $b_3$, $b_4$, and $b_5$ depict coefficients.

6. The path generation system of claim 5, wherein the path generation unit is configured to determine coefficients of the quintic polynomial equation using the initial value and the boundary value.

7. A path generation method, comprising:
acquiring state information of an ego vehicle and state information of a surrounding environment of the ego vehicle detected by a plurality of sensors;

outputting, by a processor, a terminal state of the ego vehicle based on information of the ego vehicle and information of surrounding vehicles; and generating, by the processor, a collision avoidance and mitigation path based on the terminal state to mitigate a risk level of collision damage in a situation in which the ego vehicle faces an imminent collision, wherein further comprising performing, by the processor, learning using a deep reinforcement learning algorithm, and further comprising feeding, by the processor, a collision impact index and time-to-collision (TTC)-based risk level, as a reward function, back to the deep reinforcement learning algorithm.

8. The path generation method of claim 7, further comprising learning, by the processor, i) speeds along X-axis and Y-axis, a yaw value, and lane information of the ego vehicle and ii) relative positions along X-axis and Y-axis, a speed, a yaw value, and lane information, of the surrounding vehicles.

9. The path generation method of claim 8, wherein the terminal state includes a terminal position on the collision avoidance and mitigation path, a terminal speed on the collision avoidance and mitigation path, and a time taken to reach the terminal state.

10. The path generation method of claim 9, wherein generating the collision avoidance and mitigation path comprises generating the collision avoidance and mitigation path using a quintic polynomial based algorithm for path planning.

11. The path generation method of claim 10, wherein the quintic polynomial based algorithm for path planning employs a quintic polynomial equation, initial value, and boundary value, as follows:

$$x(t) = a_0 + a_1 t + a_2 t^2 + a_3 t^3 + a_4 t^4 + a_5 t^5$$

$$y(t) = b_0 + b_1 t + b_2 t^2 + b_3 t^3 + b_4 t^4 + b_5 t^5$$

$$t_{terminal} = T$$

$$x(0) = X_{ego}[\text{m}]$$

$$y(0) = Y_{ego}[\text{m}]$$

$$v(0) = V_{ego}[\text{m/s}]$$

$$a(0) = A_{ego}[\text{m/s}^2]$$

$$\psi(0) = \psi_{ego}[\text{rad}]$$

$$x(t_{terminal}) = X_{ego} + R[\text{m}]$$

$$y(t_{terminal}) = Y_{ego} + L[\text{m}]$$

$$v(t_{terminal}) = v_T \times \tanh(R)[\text{m/s}]$$

$$a(t_{terminal}) = 0[\text{m/s}^2]$$

$$\psi(t_{terminal}) = 0[\text{rad}]$$

where x and y depict positions along x-y axes, v depicts a speed, a depicts an acceleration, $\Psi$ depicts a yaw value, t depicts a time, and $a_0$, $a_1$, $a_2$, $a_3$, $a_4$, $a_5$, $b_0$, $b_1$, $b_2$, $b_3$, $b_4$, and $b_5$ depict coefficients.

12. The path generation method of claim 11, further comprising determining, by the processor, coefficients of the quintic polynomial equation using the initial value and the boundary value.

\* \* \* \* \*